United States Patent
Haneda

(10) Patent No.: US 9,934,093 B2
(45) Date of Patent: Apr. 3, 2018

(54) CONTROL DEVICE, METHOD OF CONTROLLING A STORAGE DEVICE, AND STORAGE SYSTEM

(71) Applicant: FUJITSU LIMITED, Kawasaki-shi, Kanagawa (JP)

(72) Inventor: Terumasa Haneda, Machida (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/358,790

(22) Filed: Nov. 22, 2016

(65) Prior Publication Data

US 2017/0206133 A1 Jul. 20, 2017

(30) Foreign Application Priority Data

Jan. 19, 2016 (JP) .................................. 2016-007601

(51) Int. Cl.
  *G06F 11/10* (2006.01)
  *G06F 3/06* (2006.01)
(52) U.S. Cl.
  CPC .......... *G06F 11/1076* (2013.01); *G06F 3/064* (2013.01); *G06F 3/0619* (2013.01); *G06F 3/0673* (2013.01)
(58) Field of Classification Search
  CPC ........................... G06F 11/1076; G06F 3/0619
  USPC .................................................... 365/185.11
  See application file for complete search history.

(56) References Cited

U.S. PATENT DOCUMENTS

| | | | |
|---|---|---|---|
| 6,017,146 A | 1/2000 | Masumoto et al. | |
| 2010/0023800 A1* | 1/2010 | Harari | G06F 11/1068 714/2 |
| 2010/0174845 A1* | 7/2010 | Gorobets | G06F 12/0246 711/103 |
| 2014/0013033 A1* | 1/2014 | Sharon | G06F 11/1072 711/103 |

FOREIGN PATENT DOCUMENTS

JP 08-330979 12/1996
JP 2000-261326 9/2000

* cited by examiner

*Primary Examiner* — Hoai V Ho
*Assistant Examiner* — Muna A Techane
(74) *Attorney, Agent, or Firm* — Fujitsu Patent Center

(57) ABSTRACT

A control device configured to control a storage device includes a memory and a processor coupled to the memory and configured to store, into the storage device, a plurality of data blocks including a plurality of data patterns, classify the plurality of data blocks into the plurality of data patterns, for each of the plurality of data patterns, count numbers of the classified plurality of data blocks classified into each of the plurality of data patterns, read a first data block among the plurality of data blocks from the storage device, select a first data pattern from the plurality of data patterns based on the counted numbers when an error is detected in first data included in the first data block, replacing the first data included in the first data block with the selected first data pattern, and output the first data block including the first data pattern.

18 Claims, 14 Drawing Sheets

FIG. 5

| COUNT TABLE | | | 221a |
|---|---|---|---|
| ITEM NUMBER | DATA PATTERN | NUMBER OF APPEARANCE | |
| 1 | 0xFF | 0x80 | |
| 2 | 0x00 | 0x50 | |
| ... | ... | ... | |
| N | 0xEE | 0x03 | |

CONTROL DEVICE, METHOD OF CONTROLLING A STORAGE DEVICE, AND STORAGE SYSTEM

CROSS-REFERENCE TO RELATED APPLICATION

This application is based upon and claims the benefit of priority of the prior Japanese Patent Application No. 2016-007601, filed on Jan. 19, 2016, the entire contents of which are incorporated herein by reference.

FIELD

The embodiments discussed herein are related to a control device, a method of controlling a storage device, and a storage system.

BACKGROUND

In a related technology, errors of transferred data are detected. For example, whether or not data includes an error may be detected by using a check code such as a parity bit, a cyclic redundancy check (CRC), or the like. Then, when the data may include an error, correction processing may be performed.

In addition, the following technology related to correction processing is proposed. For example, an error correction device may manipulate demodulated data whose reliability degree information bit indicating the likelihood of the demodulated data is at a given level, and thereby generate demodulated data patterns of all combinations that may be taken by the demodulated data pattern. The error correction device may perform error correction on the demodulated data patterns.

In addition, a technology is proposed which may generate data in a table format in advance, the data including remainders obtained by a generator polynomial for error correction and a plurality of correction patterns, perform error detection processing on corrected candidates corrected based on the plurality of correction patterns, and repeat the processing until it is determined that a remainder becomes zero and that correction is made. Related art is disclosed in Japanese Laid-open Patent Publication No. 08-330979 and Japanese Laid-open Patent Publication No. 2000-261326.

SUMMARY

According to an aspect of the embodiment, a control device configured to control a storage device includes a memory and a processor coupled to the memory and configured to store, into the storage device, a plurality of data blocks including a plurality of data patterns, classify the plurality of data blocks into the plurality of data patterns, for each of the plurality of data patterns, count numbers of the classified plurality of data blocks classified into each of the plurality of data patterns, read a first data block among the plurality of data blocks from the storage device, select a first data pattern from the plurality of data patterns based on the counted numbers when an error is detected in first data included in the first data block, replacing the first data included in the first data block with the selected first data pattern, and output the first data block including the first data pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a count table;

DESCRIPTION OF EMBODIMENTS

Recently, as capacity of storage devices has been increased, errors have more often occurred in written data. In cases where a large number of errors occur, a technology is effective which corrects a multiple-bit error using a check code at a time of reading. However, this technology has such problems of being complex and involving a long correction processing time, and thus takes a long time to complete reading processing.

The present embodiments will hereinafter be described with reference to drawings.

First Embodiment

Figure 1:
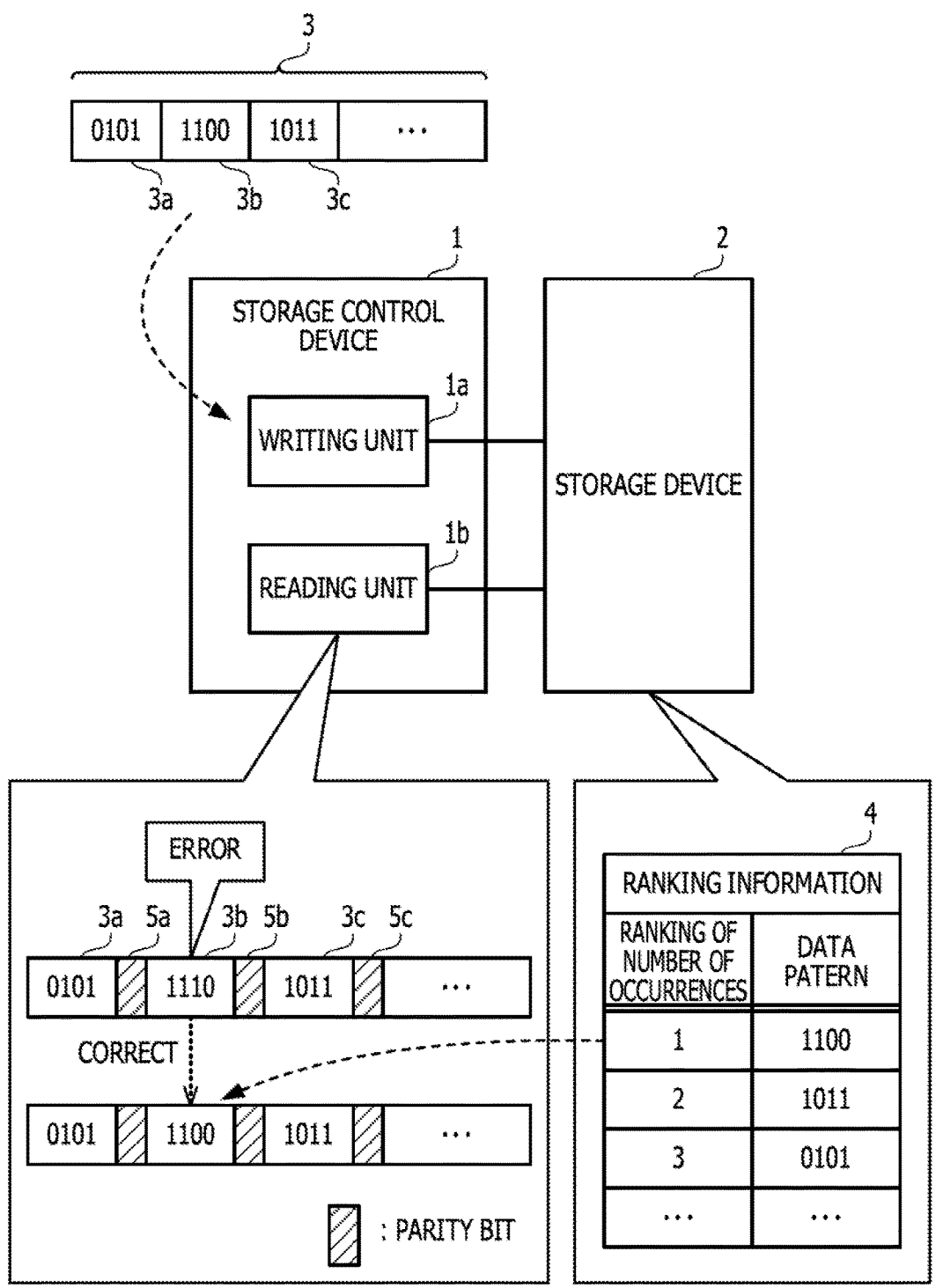
FIG. 1 is a diagram illustrating a storage control device according to a first embodiment.

FIG. 1 is a diagram illustrating a storage control device according to a first embodiment. A storage control device 1 controls reading and writing of data to a storage device 2. The storage device 2 is, for example, a random access memory (RAM), a flash memory, or the like. Incidentally, the storage control device 1 may, for example, be integrated with the storage device 2.

The storage control device 1 includes a writing unit 1a and a reading unit 1b. The writing unit 1a and the reading unit 1b are each implemented as a separate electronic circuit, for example. Alternatively, the processing of the writing unit 1a and the reading unit 1b may be realized by a processor by executing a given program.

The writing unit 1a performs the following processing when writing a data block group 3 including a plurality of data blocks 3a, 3b, 3c, . . . to the storage device 2. The writing unit 1a counts, for each of a plurality of data patterns, the number of data blocks including the same data pattern from among the plurality of data blocks 3a, 3b, 3c, . . . . The plurality of data patterns are data patterns that may be taken by the data blocks included in the data block group 3. The counted value for each data pattern will hereinafter be described as a "number of occurrences." Incidentally, suppose in the example of FIG. 1 that the data patterns of the data blocks 3a, 3b, and 3c are "0101," "1100," and "1011," respectively.

The writing unit 1a writes ranking information 4 indicating a ranking given to each of the plurality of data patterns in order of the number of occurrences to the storage device 2 together with the plurality of data blocks 3a, 3b, 3c, . . . . In the example of FIG. 1, the plurality of data patterns are sorted and registered in descending order of the number of occurrences in the ranking information 4. In addition, suppose in the example of FIG. 1 that the number of occurrences is decreased in order of "1100," "1011," and "0101."

Incidentally, the plurality of data blocks 3a, 3b, 3c, . . . are stored in the storage device 2 in a state that enables detection of the presence or absence of an error in data block units at a time of reading. An error detecting method may be a simple method. Suppose in the present embodiment that a method using a parity bit is used as an example of the error detecting method. Parity bits 5a, 5b, and 5c, for example, are added to the respective data blocks 3a, 3b, and 3c, and stored in the storage device 2.

The reading unit 1b performs the following processing when reading the plurality of data blocks 3a, 3b, 3c, . . . written to the storage device 2. The reading unit 1b checks whether or not there is an error when reading the plurality of data blocks 3a, 3b, 3c, . . . . In the present embodiment, whether or not there is an error is checked by using the parity bits added to the respective data blocks. Here, suppose that an error is detected from the data block 3b.

The reading unit 1b replaces the data block 3b by using a data pattern selected based on the ranking information 4 from among the plurality of data patterns. For example, the reading unit 1b identifies data patterns whose parity bits calculated based on the data patterns include a same value as the parity bit 5b added to the data block 3b from among the plurality of data patterns. The reading unit 1b replaces the data block 3b by using a data pattern including a highest ranking among the identified data patterns. In the example of FIG. 1, the data block 3b is replaced by using "1100."

Here, the larger the number of occurrences of a data pattern, the stronger a possibility of the data pattern being a correct bit string of the data block 3b from which the error is detected. Therefore, the reading unit 1b selects a data pattern including a highest possible ranking from among the plurality of data patterns based on the ranking information 4, and replaces the data block 3b by using the selected data pattern. Consequently, the error may be corrected with a high probability. Moreover, there is a possibility of being able to correct a multiple-bit error as well as the one-bit error in the data block 3b.

Thus, according to the first embodiment, data correction processing is performed by using a simple processing procedure of selecting a data pattern based on the ranking information 4, and replacing a data block by using the selected data pattern. Hence, it is possible to realize high-speed correction processing that may correct a multiple-bit error.

Second Embodiment

Figure 2:
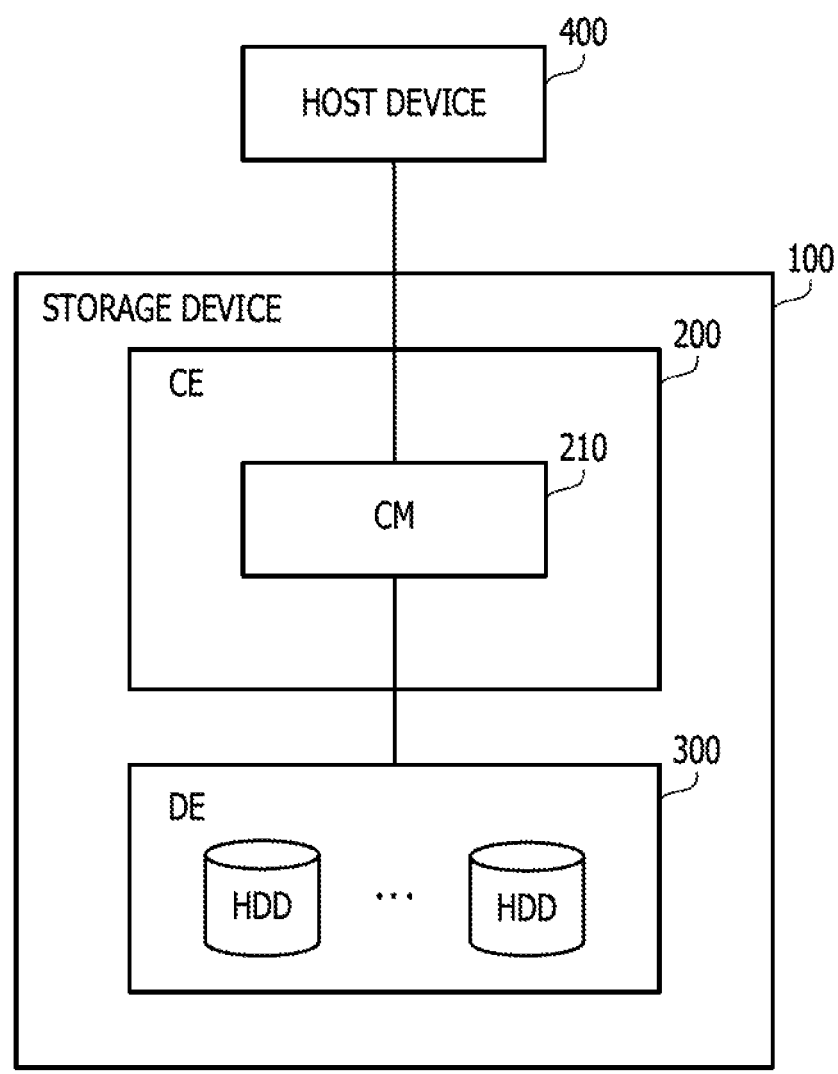
FIG. 2 is a diagram illustrating a storage system according to a second embodiment.

FIG. 2 is a diagram illustrating a storage system according to a second embodiment. The storage system illustrated in FIG. 2 includes a storage device 100 and a host device 400. The storage device 100 and the host device 400 are, for example, coupled to each other via a storage area network (SAN) using a fiber channel (fibre channel (FC)), internet small computer system interface (iSCSI), or the like.

The storage device 100 includes a controller enclosure (CE) 200 and a device enclosure (DE) 300.

The CE 200 includes a CM 210. The DE 300 includes a plurality of storage devices. The DE 300 is a disk array device including hard disk drives (HDDs) as storage devices. Incidentally, the storage devices included in the DE 300 may be other kinds of storage devices such as solid state drives (SSDs) or the like. The CM 210 controls access to the HDDs included in the DE 300 according to a request from the host device 400.

Description will next be made of hardware of the CM.

Figure 3:
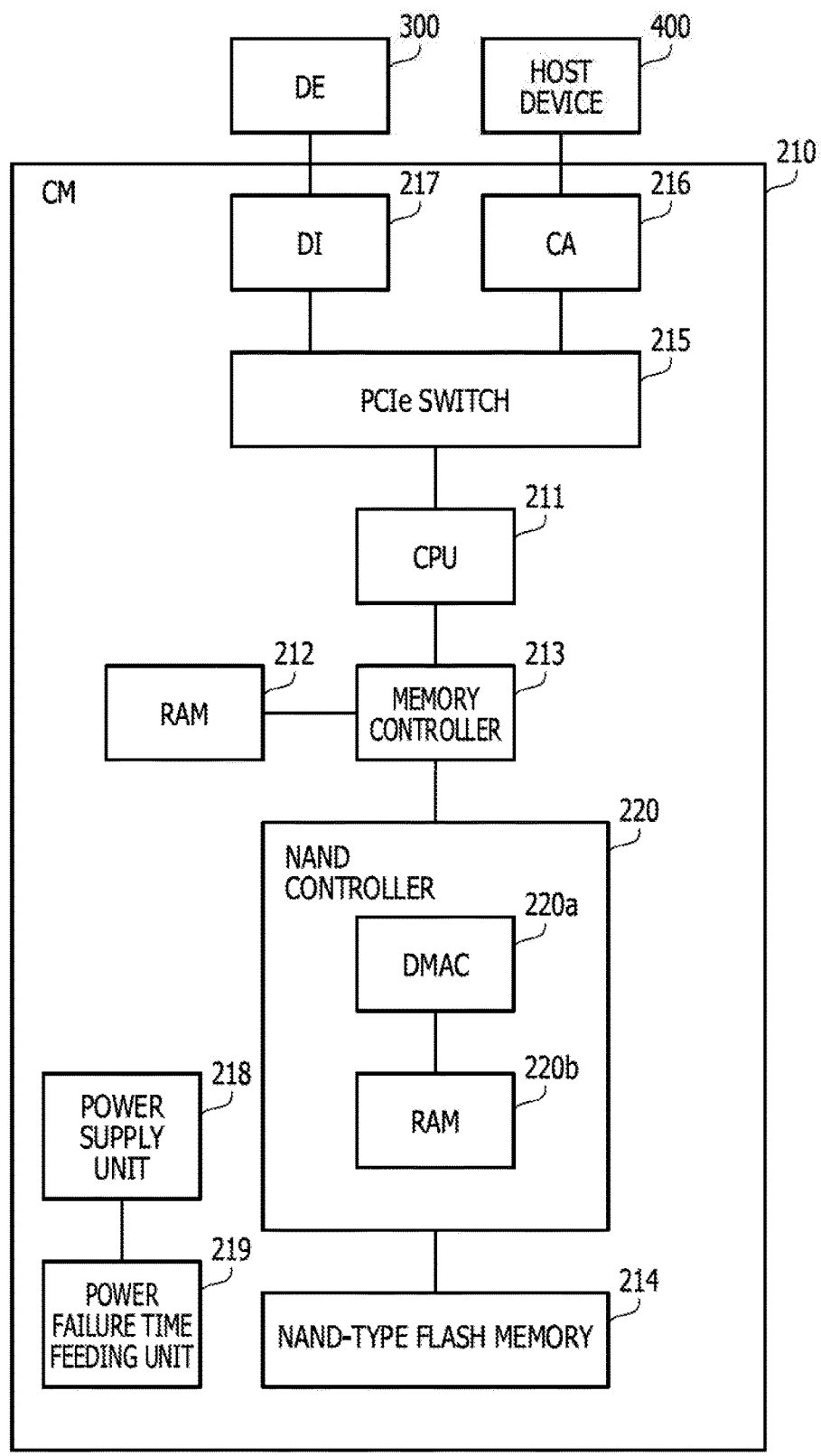
FIG. 3 is a diagram illustrating an example of hardware of a controller module (CM)

FIG. 3 is a diagram illustrating an example of hardware of a CM. The CM 210 includes a central processing unit (CPU) 211, a RAM 212, a memory controller 213, a NAND-type flash memory 214, a peripheral components interconnect express (PCIe) switch 215, a channel adapter (CA) 216, a device interface (DI) 217, a power supply unit 218, a power failure time feeding unit 219, and a NAND controller 220.

The CPU 211 controls the information processing of the CM 210. The CPU 211 may be a multiprocessor including a plurality of processing elements.

The RAM 212 is a main storage device of the CM 210. The RAM 212 temporarily stores at least part of the program of an operating system (OS) executed by the CPU 211 and an application program. The RAM 212 also stores various kinds of data used for processing by the CPU 211.

The memory controller 213 reads various kinds of data stored in the RAM 212, or writes various kinds of data to the RAM 212 according to an instruction of the CPU 211 or the NAND controller 220.

The NAND-type flash memory 214 backs up data stored in the RAM 212 when the storage device 100 is stopped due to a power failure.

The PCIe switch 215 transmits data to the CPU 211, the CA 216, and the DI 217 and receives data from the CPU 211, the CA 216, and the DI 217. The CA 216 is an interface for communicating with the host device 400. The DI 217 is an interface for communicating with the DE 300.

The power supply unit 218 is externally supplied with the power of a power supply, and supplies power to various parts within the storage device 100. The power failure time feeding unit 219 includes a battery not illustrated in the figure. When the power supply from the power supply unit 218 is stopped due to a power failure or the like, the power failure time feeding unit 219 supplies power from the battery to the RAM 212, the memory controller 213, the NAND-type flash memory 214, and the NAND controller 220.

The NAND controller 220 includes a direct memory access controller (DMAC) 220a and a RAM 220b. The DMAC 220a performs a writing operation of writing data stored in the RAM 212 to the NAND-type flash memory 214 and a reading operation of reading the data stored in the NAND-type flash memory 214 and writing back the data to the RAM 212. The DMAC 220a, for example, performs the above-described writing operation when the power failure time feeding unit 219 notifies the DMAC 220a that the power supply from the power supply unit 218 is stopped. In addition, the DMAC 220a, for example, performs the above-described reading operation when the power failure time feeding unit 219 notifies the DMAC 220a that the power supply from the power supply unit 218 is resumed. Incidentally, the DMAC 220a may read the NAND-type flash memory 214 and write the NAND-type flash memory 214 according to an instruction from the CPU 211. The RAM 220b temporarily stores the data stored in the NAND-type flash memory 214.

Functions of the NAND controller will next be described.

Figure 4:
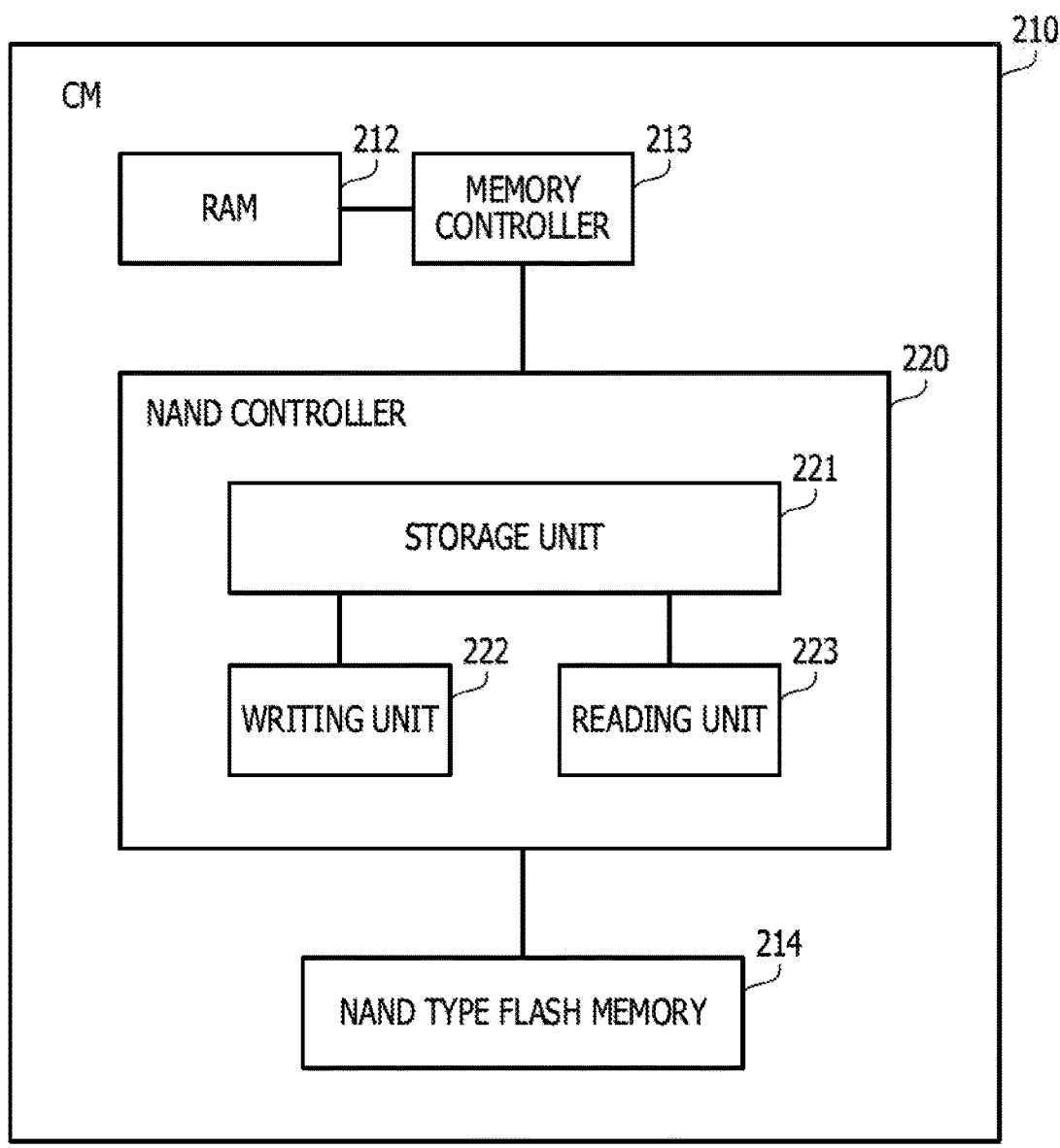
FIG. 4 is a diagram illustrating an example of functions of a not AND (NAND) controller.

FIG. 4 is a diagram illustrating an example of functions of a NAND controller. The NAND controller 220 includes a storage unit 221, a writing unit 222, and a reading unit 223. Incidentally, the CPU 211 and the like included in the CM 210 are omitted in FIG. 4.

The storage unit 221 is, for example, implemented as a storage area secured in the RAM 220b. The storage unit 221 temporarily stores data obtained from the RAM 212. In this case, processing of writing the data to the NAND-type flash memory 214 is performed in page units. The size of a page is, for example, 16 kilobytes. The storage unit 221 accumulates the data obtained from the RAM 212 until the data reaches at least the size of a page unit. Then the accumulated data is stored in the NAND-type flash memory 214. Incidentally, when the data is read from the NAND-type flash memory 214, processing of reading the data is performed in page units.

The storage unit 221 also stores a count table. Registered in the count table is information retaining, for each data pattern, the number of occurrences of the same data pattern in the data of the one page written to the NAND-type flash memory 214. The data patterns are counted in the size of unit units. The size of a unit is, for example, eight bits.

The writing unit 222 and the reading unit 223 are, for example, realized as part of the DMAC 220a.

When the power supply from the power supply unit 218 is stopped, the writing unit 222 reads the data stored in the RAM 212 via the memory controller 213, and writes the data to the NAND-type flash memory 214. This writing is performed by the following procedure.

The writing unit 222 temporarily stores the data read from the RAM 212 in the storage unit 221. When data of one page is accumulated in the storage unit 221, the writing unit 222 writes the data to a free page of the NAND-type flash memory 214. At this time, the writing unit 222 detects data patterns on a unit-by-unit basis in the data of the one page, counts, for each of the data patterns that may be taken by units, the number of occurrences of the same data pattern, and registers a result of the counting in the count table. In addition, the writing unit 222 calculates a CRC based on the data of the one page. In addition, the writing unit 222 calculates a parity bit for each unit. The writing unit 222 adds the calculated parity bit to the unit, and writes the unit to which the parity bit is added to the NAND-type flash memory 214. In addition, the writing unit 222 writes the CRC and the count table to the NAND-type flash memory 214 in association with the page as a writing destination of data.

When the power supply from the power supply unit 218 is resumed, the reading unit 223 reads the data stored in the NAND-type flash memory 214, and writes back the data to the RAM 212 via the memory controller 213. The following error correction processing is performed at the time of reading the data on a page-by-page basis from the NAND-type flash memory 214.

Before reading data from one page of the NAND-type flash memory 214, the reading unit 223 reads a CRC and a count table associated with this page from the NAND-type flash memory 214, and stores the CRC and the count table in the storage unit 221. The reading unit 223 next reads units and parity bits from the page, and stores the units and the parity bits in the storage unit 221. The reading unit 223 error-checks the read data of the one page, that is, a set of the units, using the CRC. When an error is included, the reading unit 223 identifies a unit including the error using a parity bit, selects a data pattern registered in the count table in decreasing order of the number of occurrences, and attempts to correct the error by using the selected data pattern. The reading unit 223 determines whether the correction may be made according to whether or not a parity bit calculated based on the selected data pattern and the parity bit added to the unit including the error coincide with each other. When the reading unit 223 determines that the correction may be made, the reading unit 223 corrects the error by replacing the unit including the error with the data pattern.

The count table will next be described in detail.

FIG. 5 is a diagram illustrating an example of a count table. The count table 221a is generated for each page in the storage unit 221, and is stored in the NAND-type flash memory 214. The count table 221a includes the items of an item number, a data pattern, and the number of occurrences.

Information for identifying a record is registered as the item of the item number. A data pattern is registered as the item of the data pattern. The number of times that the data pattern occurs in the page is registered as the item of the number of occurrences. In addition, records corresponding to all of the data patterns that may be taken by units are registered in the count table 221a. In addition, in a stage in which the count table 221a is stored in the NAND-type flash memory 214, the records are sorted in decreasing order of the number of occurrences. In this stage, the item number indicates a ranking of the number of occurrences. For example, information including an item number of "1," a data pattern of "0xFF," and a number of occurrences of "0x80" is registered in the count table 221a. Supposing that this count table 221a is in a state after the sorting of the records, this indicates that a data pattern that occurs a highest number of times is "0xFF," and that the number of times that the data pattern occurs is "0x80." When such a count table 221a is stored, information indicating a ranking given to each data pattern according to the number of occurrences is stored in association with the page.

Incidentally, suppose in the present embodiment that a unit is eight bits. While data patterns are represented by a hexadecimal number in FIG. 5, actual data patterns are a bit string of eight bits.

Figure 6:
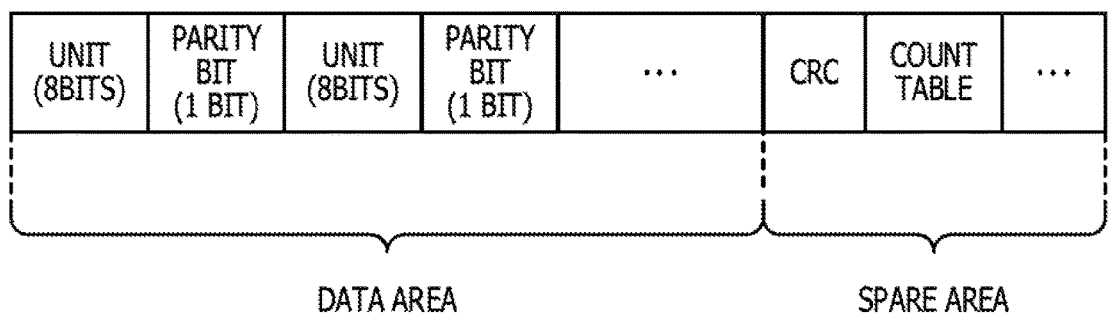
FIG. 6 is a diagram illustrating an example of structure of a storage area in a NAND-type flash memory.

FIG. 6 is a diagram illustrating an example of structure of a storage area in a NAND-type flash memory. In the NAND-type flash memory 214, a DATA area and a SPARE area are assigned to each page. The DATA area is an area in which normal writing data is written. In the present embodiment, the DATA area stores units to which a parity bit is added. The SPARE area is an area assigned to store error correction information and control information. In the present embodiment, the SPARE area stores the CRC and the count table 221a.

Detailed description will next be made of processing up to the storing of written data stored in the RAM 212 into the NAND-type flash memory 214.

Figure 7:
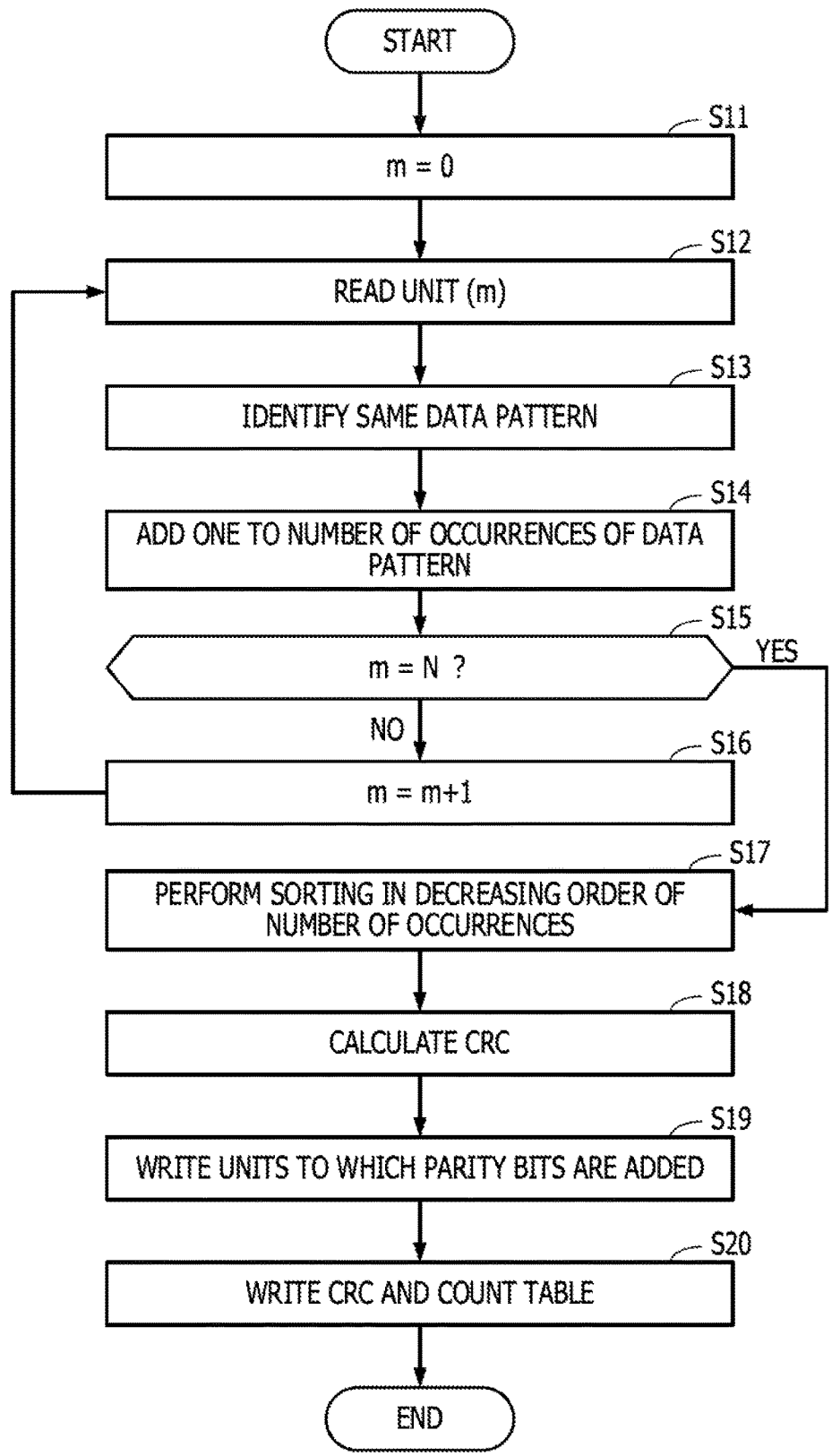
FIG. 7 is a flowchart illustrating an example of writing processing.

FIG. 7 is a flowchart illustrating an example of writing processing. Though not illustrated in the figure, the writing unit 222 sequentially reads data from the RAM 212, and stores the data in the storage unit 221. In parallel with this storing processing, the writing unit 222 performs the processing of FIG. 7 while monitoring an amount of data stored in the storage unit 221. Incidentally, the data may be stored into the storage unit 221 according to an instruction from the CPU 211, for example. The processing illustrated in FIG. 7 will be described in the following along step numbers.

(S11) The writing unit 222 assigns zero to m. m is a variable indicating the number of a unit. A "unit (m)" denotes an m-th unit. Suppose in this case that one page includes a zeroth to an N-th unit.

(S12) When data of one unit is accumulated in the storage unit 221, the writing unit 222 reads the unit (m) from the storage unit 221. In addition, the writing unit 222 generates a count table 221*a* corresponding to the unit (m), and stores the count table 221*a* in the storage unit 221. Only an item number and a data pattern are registered in the generated count table 221*a*.

(S13) The writing unit 222 refers to the count table 221*a*, and identifies the same data pattern as the unit (m).

(S14) The writing unit 222 adds one to the number of occurrences of the record corresponding to the data pattern identified in step S13 among records in the count table 221*a*. For example, in a case where the data pattern of data of the unit (m) is "0xFF," the writing unit 222 adds one to the number of occurrences corresponding to the data pattern item "0xFF" in the count table 221*a*.

(S15) The writing unit 222 determines whether or not m is N. When m is N, the writing unit 222 advances the processing to step S17. When m is not N, the writing unit 222 advances the processing to step S16.

(S16) The writing unit 222 adds one to m. The writing unit 222 then advances the processing to step S12.

(S17) The writing unit 222 sorts the records in the count table 221*a* in decreasing order of the number of occurrences. In addition, after the sorting, the writing unit 222 renumbers the items of the item numbers in the count table 221*a* in decreasing order of the number of occurrences.

(S18) The writing unit 222 calculates a CRC based on units of one page. The CRC is, for example, a remainder obtained by dividing bit strings of the units of the one page by a given constant.

(S19) The writing unit 222 calculates a parity bit for each unit. The writing unit 222 adds the calculated parity bit to each unit. Then, the writing unit 222 writes writing data including the units to which the parity bits are added to the DATA area of the NAND-type flash memory 214.

(S20) The writing unit 222 writes the CRC calculated in step S18 and the count table 221*a* in the SPARE area corresponding to the DATA area as a writing destination in step S19 among areas of the NAND-type flash memory 214. The writing unit 222 then ends the processing.

As a result of the above processing of FIG. 7, the units of the one page to which units the parity bits are added are written to the NAND-type flash memory 214 together with the count table 221*a* and the CRC corresponding to the page. Incidentally, in the processing of FIG. 7, the processing of steps S12 to S14 is performed each time data of one unit is accumulated in the storage unit 221. It is thereby possible to reduce an effect of the processing of counting the numbers of occurrences of data patterns on a data writing processing time as a whole.

Description will next be made of processing when the data stored in the NAND-type flash memory 214 is read.

Figure 8:
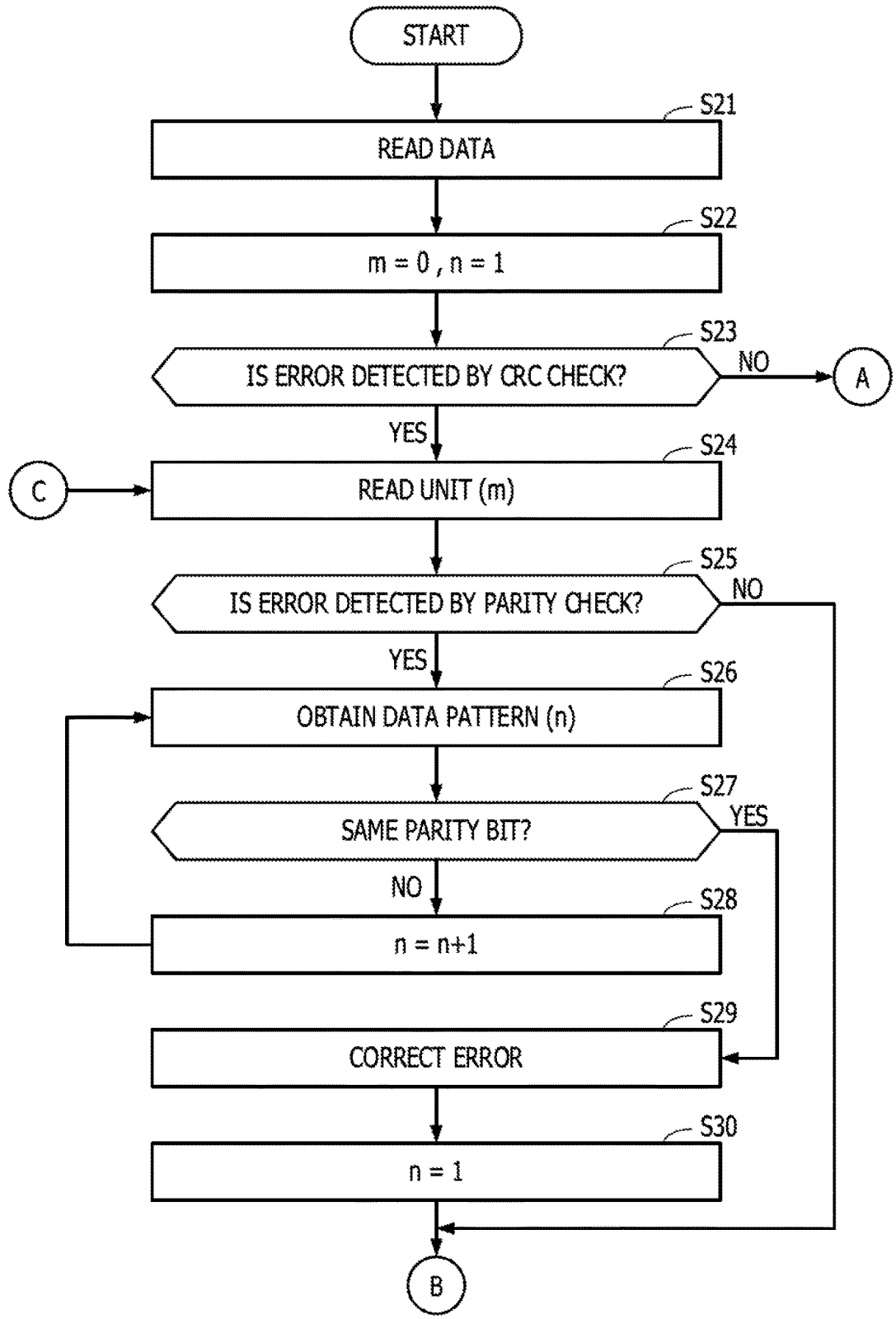
FIG. 8 is a flowchart illustrating an example (1) of reading processing.

FIG. 8 is a flowchart illustrating an example (1) of the reading processing. The reading unit 223 reads the data stored in the NAND-type flash memory 214 in page units. FIG. 8 illustrates the processing in page units. Incidentally, the data may be read from the NAND-type flash memory 214 according to an instruction from the CPU 211, for example. The processing illustrated in FIG. 8 will be described in the following along step numbers.

(S21) The reading unit 223 reads, to the storage unit 221, units of one page from a DATA area corresponding to the target page in the NAND-type flash memory 214 together with parity bits. In addition, the reading unit 223 reads, to the storage unit 221, a CRC and a count table 221*a* from a SPARE area corresponding to the DATA area.

(S22) The reading unit 223 assigns zero to m. In addition, the reading unit 223 assigns one to n. n is a variable indicating an item number in the count table 221*a*. A "data pattern (n)" denotes a data pattern registered in the record of the item number n.

(S23) The reading unit 223 determines whether or not an error is included in the units of the one page which units are read in step S21, using the CRC read in step S21. When detecting an error, the reading unit 223 advances the processing to step S24. When detecting no error, the reading unit 223 advances the processing to step S35.

(S24) The reading unit 223 reads a unit (m) from the storage unit 221.

(S25) The reading unit 223 determines whether or not an error is included in the unit (m) by using the parity bit added to the unit (m). When detecting an error, the reading unit 223 advances the processing to step S26. When detecting no error, the reading unit 223 advances the processing to step S31.

(S26) The reading unit 223 obtains a data pattern (n) from the count table 221*a* read in step S21.

(S27) The reading unit 223 calculates a parity bit based on the data pattern (n). The reading unit 223 determines whether or not the calculated parity bit and the parity bit added to the unit (m) are the same. When the calculated parity bit and the parity bit added to the unit (m) are the same, the reading unit 223 advances the processing to step S29. When the calculated parity bit and the parity bit added to the unit (m) are different from each other, the reading unit 223 advances the processing to step S28.

(S28) The reading unit 223 adds one to n. The reading unit 223 then advances the processing to step S26.

(S29) The reading unit 223 corrects the error by replacing the bit string of the unit (m) stored in the storage unit 221 with the data pattern (n).

(S30) The reading unit 223 assigns one to n. The reading unit 223 then advances the processing to step S31.

Figure 9:
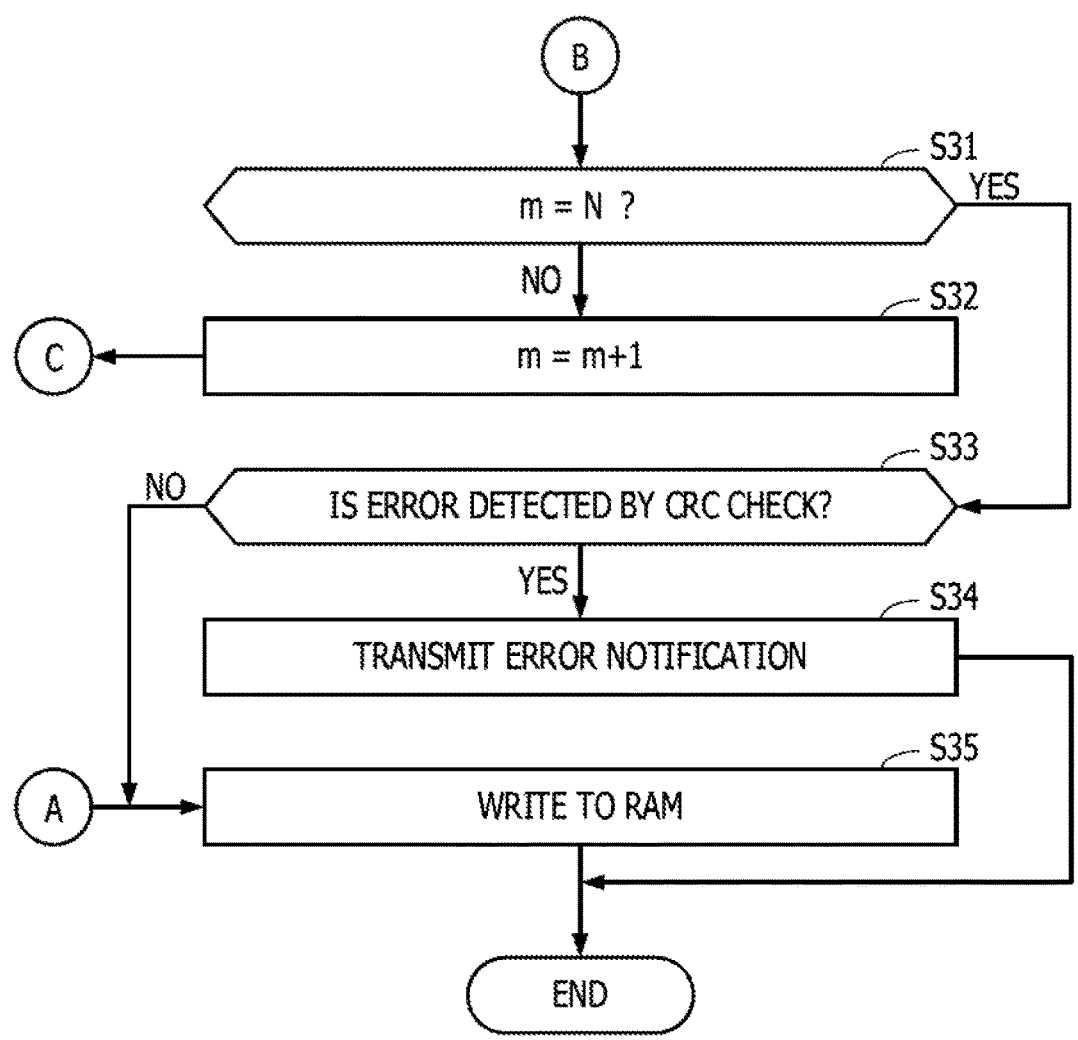
FIG. 9 is a flowchart illustrating an example (2) of reading processing.

FIG. 9 is a flowchart illustrating an example (2) of reading processing. The processing illustrated in FIG. 9 will be described in the following along step numbers.

(S31) The reading unit 223 determines whether or not m is N. When m is N, the reading unit 223 advances the processing to step S33. When m is not N, the reading unit 223 advances the processing to step S32.

(S32) The reading unit 223 adds one to m. The reading unit 223 then advances the processing to step S24.

(S33) The reading unit 223 determines whether or not an error is included in the units of the one page after the correction which units are stored in the storage unit 221, using the CRC read in step S21. When detecting an error, the reading unit 223 advances the processing to step S34. When detecting no error, the reading unit 223 deletes the parity bit added to each unit, and transmits the written data to a request source of reading. The reading unit 223 then advances the processing to step S35.

(S34) The reading unit 223 transmits an error notification to the request source of reading. The reading unit 223 then ends the processing.

(S35) The reading unit 223 writes the units of the one page which units are stored in the storage unit 221 to the RAM 212 via the memory controller 213. In addition, the reading unit 223 erases the units, the parity bits, the CRC, and the count table 221a stored in the storage unit 221.

According to the above-described processing of FIGS. 8 and 9, when the reading unit 223 detects an error of a unit read from the NAND-type flash memory 214, the reading unit 223 selects data patterns in decreasing order of the number of occurrences on the page. The reading unit 223 then corrects the error of the unit by replacing the bit string of the unit by using a data pattern whose parity bit coincides with the parity bit read from the NAND-type flash memory 214.

This correction processing uses an idea that the higher the number of occurrences of a data pattern, the stronger a possibility of the data pattern being the correct value of the unit from which the error is detected. The error may be corrected by the correction processing based on this idea, for example, a simple processing procedure of replacing the bit string of the unit by using the data pattern selected based on the number of occurrences. In addition, according to this error correction processing, the number of bits that can be corrected is not limited, but an error of two bits or more may also be corrected.

A probability of determining that the parity bits are the same in step S27 in FIG. 8 is ½. Therefore, on an average on a page as a whole, in processing for each unit, parity bit calculation is performed approximately a total of three times, for example, once in step S25 and twice in step S27. That is, errors may be corrected by three times of parity bit calculation and pattern replacement processing per unit.

Hence, the load of the error correction processing may be reduced at least as compared with error correction processing that may correct errors of two bits or more using an ECC. As a result, the speed of the error correction processing may be improved, and the processing time of the error correction processing may be shortened. That is, it is possible to realize multi-bit error correction processing in which more importance is attached to error correction speed than to error correction accuracy. In addition, the larger the number of bits of a unit becomes, the more the load of the error correction processing may be reduced, as compared with most of the error correction processing that may correct one-bit errors using ECCs.

Further, because a parity bit is uniquely determined from a data pattern, parity bits based on data patterns may be registered in respective records in the count table 221a in advance. In this case, without calculating the parity bit in step S27, it suffices to perform only the comparison of the parity bit read from the count table 221a with the parity bit read from the NAND-type flash memory 214. According to such processing, it is possible to reduce the load of the error correction processing more reliably than that of the error correction processing that may correct one-bit errors using ECCs.

Third Embodiment

A third embodiment will next be described. Description will be made mainly of matters different from the foregoing second embodiment, and description of common matters will be omitted.

The third embodiment provides a function that, when a unit read from the NAND-type flash memory 214 includes an error, identifies a data pattern including a one-bit difference from the unit in question from the count table 221a, and corrects the error.

A storage device and functions of the third embodiment are similar to the device and the functions of the second embodiment. Accordingly, in the third embodiment, the same reference symbols and names as in the second embodiment are used.

Figure 10:
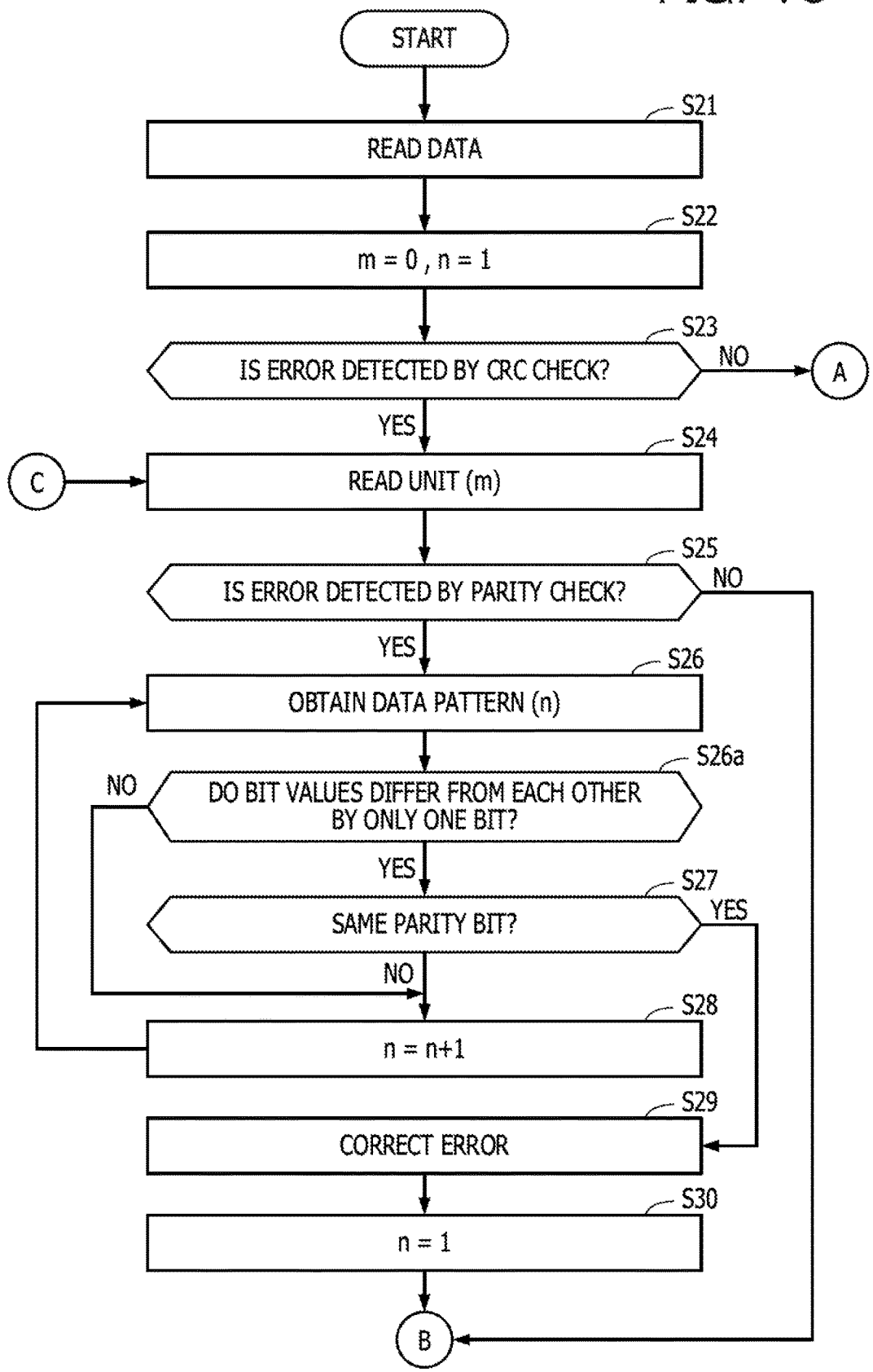
FIG. 10 is a flowchart illustrating an example of reading processing according to a third embodiment.

FIG. 10 is a flowchart illustrating an example of reading processing according to a third embodiment. In the third embodiment, the processing of FIG. 8 is modified as in FIG. 10. Description will be made only of processing steps different from those of FIG. 8, and description of other steps will be omitted. In addition, in FIG. 10, step S26a is added following step S26.

(S26a) The reading unit 223 compares the data pattern (n) obtained in step S26 with the unit (m). The reading unit 223 determines whether or not a result of the comparison indicates that the bit values differ from each other by one bit. For example, a Hamming distance between the obtained data pattern (n) and the unit (m) is calculated, and when a resulting bit string includes a single number one, it is determined that the bit values differ from each other by one bit. When the bit values differ from each other by one bit, the reading unit 223 advances the processing to step S27. When the bit values differ from each other by two bits or more, the reading unit 223 advances the processing to step S28.

When an error of a unit read from the NAND-type flash memory 214 is detected, a probability of the error being a one-bit error is highest. In addition, according to the above-described processing, a condition that the bit values of the read unit and the data pattern to be used for correction differ from each other by one bit is added as a condition for selecting the data pattern to be used for correction. It is consequently possible to correct one-bit errors with high accuracy as compared with the second embodiment, and also improve error correction accuracy on a page as a whole.

Fourth Embodiment

A fourth embodiment will next be described. Description will be made mainly of matters different from those of the foregoing second embodiment, and description of common matters will be omitted.

In the fourth embodiment, a count table obtained by adding the item of a parity bit to the count table 221a is used. When a unit read from the NAND-type flash memory 214 includes an error, a data pattern corresponding to the same parity bit as a parity bit added to the unit in question is then identified from the count table in question, and the error is corrected. The fourth embodiment provides such a function.

A storage device and functions of the fourth embodiment are similar to the device and the functions of the second embodiment. Accordingly, in the fourth embodiment, the same reference symbols and names as in the second embodiment are used. In addition, in the fourth embodiment, a count table obtained by adding the item of a parity bit to the count table 221a as described above is generated. The count table will be described with reference to FIG. 11.

Figure 11:
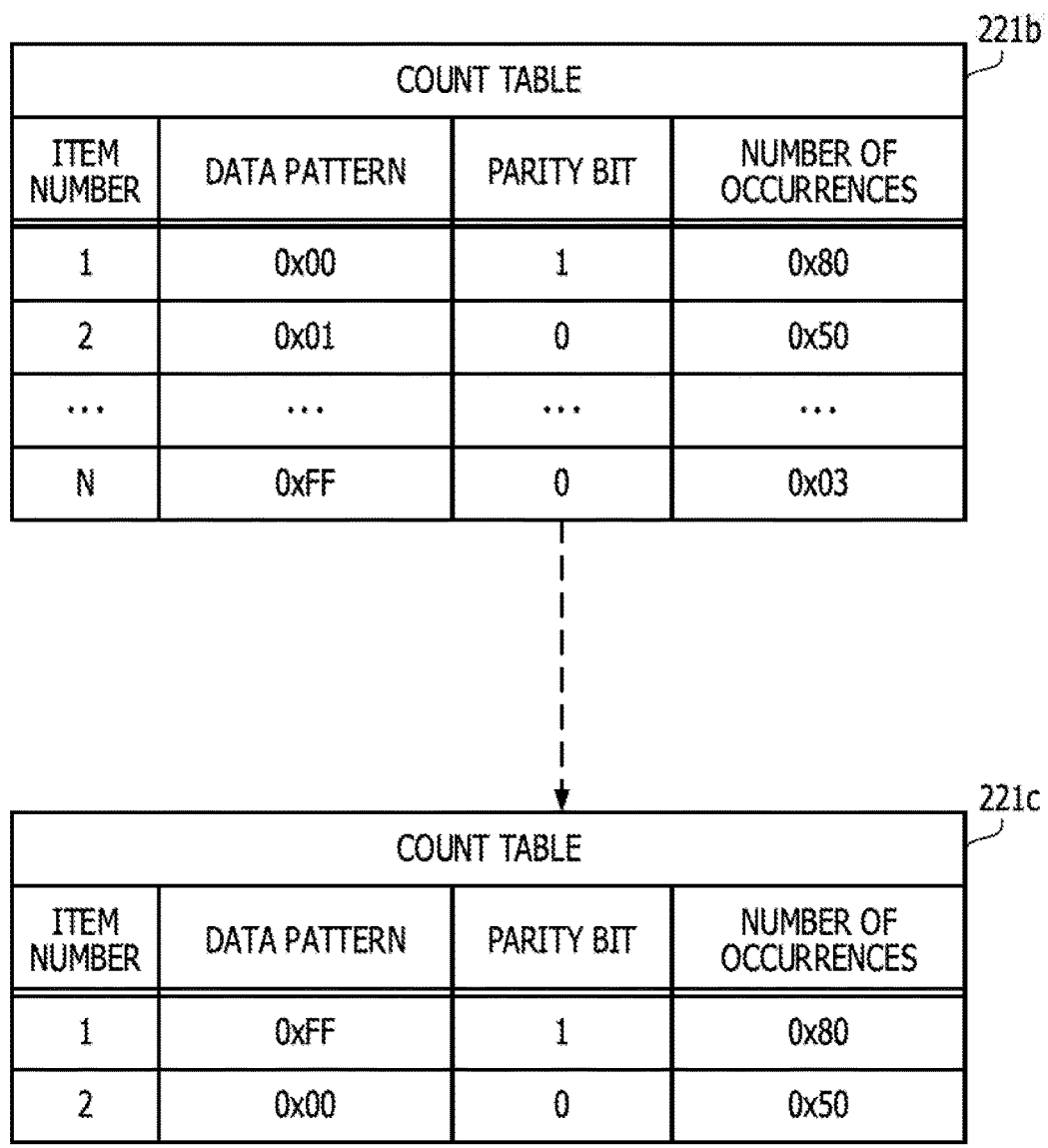
FIG. 11 is a diagram illustrating an example of a count table according to a fourth embodiment.

FIG. 11 is a diagram illustrating an example of a count table according to the fourth embodiment. The count table 221b is stored in the storage unit 221. The count table 221b includes the items of an item number, a data pattern, a parity bit, and the number of occurrences. The count table 221b is obtained by adding the item of the parity bit to the items of the count table 221a. The parity bit calculated based on the corresponding data pattern is registered as the item of the parity bit. The parity bit is uniquely determined from the data pattern. Thus, the count table 221b in an initial state includes information registered as the respective items of the item number, the data pattern, and the parity bit in advance.

After the writing unit 222 generates the count table 221b based on units of one page, the writing unit 222 modifies the count table 221b as a count table 221c. The count table 221c is obtained by extracting a record including a highest number of occurrences among records whose parity bit is "1" in the count table 221b and a record including a highest number of occurrences among records whose parity bit is "0" in the count table 221b.

Figure 12:
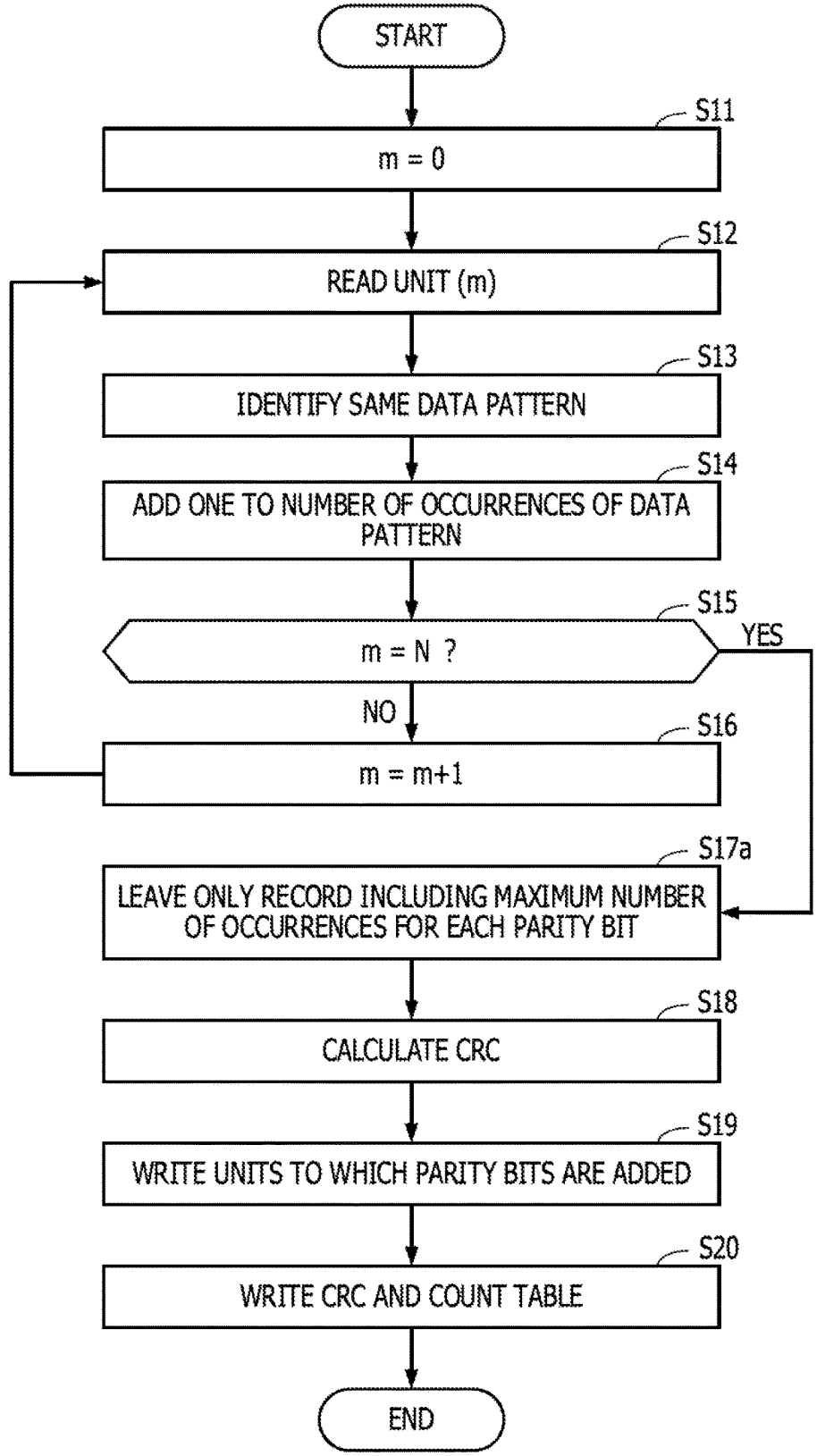
FIG. 12 is a flowchart illustrating an example of writing processing according to the fourth embodiment.

FIG. 12 is a flowchart illustrating an example of writing processing according to the fourth embodiment. In the fourth embodiment, the processing of FIG. 7 is modified as in FIG. 12. Description will be made only of processing steps different from those of FIG. 7, and description of other steps will be omitted. In FIG. 12, step S17 is changed to step S17a. Incidentally, in steps S13 and S14, the count table 221b is used in place of the count table 221a.

(S17a) The writing unit 222 identifies a record including a maximum number of occurrences from among records whose parity bit is zero in the count table 221b. In addition, the writing unit 222 identifies a record including a maximum number of occurrences from among records whose parity bit is one in the count table 221b. The writing unit 222 generates the count table 221c by leaving only the two identified records and deleting the other records from the count table 221b.

Incidentally, in step S20, the count table 221c generated in step S17a is written to the SPARE area.

Figure 13:
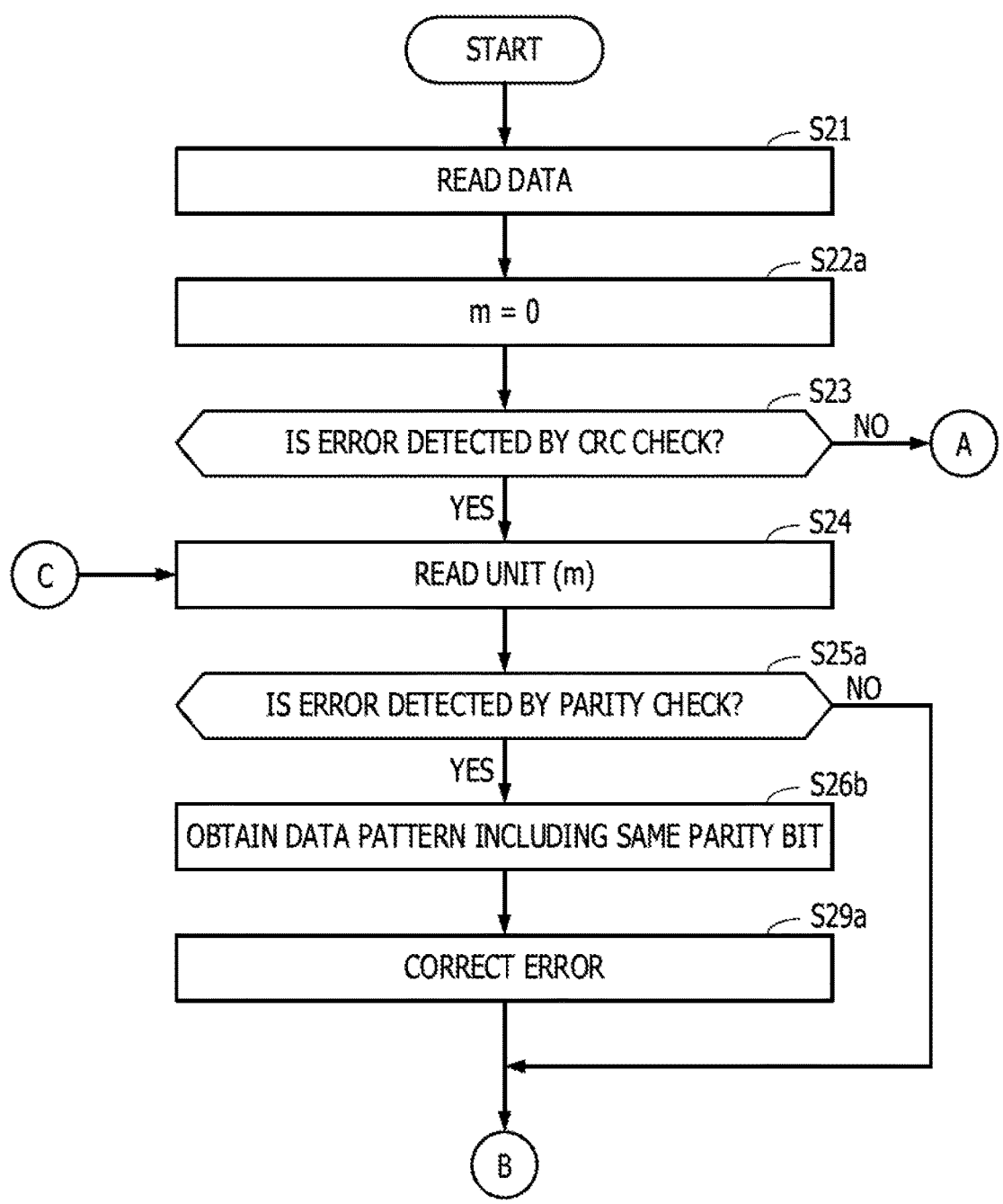
FIG. 13 is a flowchart illustrating an example of reading processing according to the fourth embodiment.

FIG. 13 is a flowchart illustrating an example of reading processing according to the fourth embodiment. In the fourth embodiment, the processing of FIG. 8 is modified as in FIG. 13. Description will be made only of processing steps different from those of FIG. 8, and description of other step will be omitted. In addition, in FIG. 13, step S22 in FIG. 8 is changed to step S22a, step S25 in FIG. 8 is changed to step S25a, step S26 in FIG. 8 is changed to step S26b, step S29 in FIG. 8 is changed to step S29a, and steps S27, S28, and S30 in FIG. 8 are not performed.

(S22a) The reading unit 223 assigns zero to m. The reading unit 223 then advances the processing to step S23.

(S25a) The reading unit 223 determines whether or not an error is included in the unit (m) by using the parity bit added to the unit (m). When detecting an error, the reading unit 223 advances the processing to step S26b. When detecting no error, the reading unit 223 advances the processing to step S31.

(S26b) The reading unit 223 refers to the count table 221c, and obtains the data pattern corresponding to the same parity bit as the parity bit added to the unit (m). The reading unit 223 then advances the processing to step S29a.

(S29a) The reading unit 223 corrects the error by replacing the unit (m) with the data pattern obtained in step S26b. The reading unit 223 then advances the processing to step S31.

According to the fourth embodiment described above, the reading unit 223 selects a data pattern to be used for correction based on a parity bit from the two data patterns registered in the count table 221c. As compared with the processing of FIG. 8 in the second embodiment, the number of parity bit calculations is decreased because step S26b is performed in place of step S26. Therefore, as compared with the second embodiment, the load of processing for selecting a data pattern to be used for correction is reduced, and the processing time is shortened. It is consequently possible to reduce the processing load and shorten the processing time as compared with conventional processing that detects and corrects an error using an ECC.

In addition, as compared with the second embodiment, capacity of the count table 221c stored for each page in the NAND-type flash memory 214 is decreased. It is therefore possible to improve usage efficiency of storage areas of the NAND-type flash memory 214.

Fifth Embodiment

A fifth embodiment will next be described. Description will be made mainly of matters different from those of the foregoing second and fourth embodiments, and description of common matters will be omitted.

The fifth embodiment uses the count table 221b in FIG. 11 in which parity bits are associated with bit patterns. In processing of writing units of one page to the NAND-type flash memory 214, the count table 221b in a state in which records are sorted in decreasing order of the number of occurrences is stored in the SPARE area of the NAND-type flash memory 214. In addition, when a unit read from the NAND-type flash memory 214 includes an error, records in which the same parity bit as a parity bit added to the unit in question is registered are identified from the stored count table 221b. Then, a data pattern whose bit value differs from the unit in question by one bit is identified from among the data patterns of the identified records, and the error is corrected. The fifth embodiment provides such a function.

A storage device and functions of the fifth embodiment are similar to the device and the functions of the second and fourth embodiments. Accordingly, in the fifth embodiment, the same reference symbols and names as in the second and fourth embodiments are used. In addition, in the fifth embodiment, the count table 221b is generated, as described above.

First, a processing procedure for writing units of one page to the NAND-type flash memory 214 is basically similar to that of FIG. 7, and is therefore not illustrated in the figure herein. However, in the present embodiment, there are differences from FIG. 7 in that the count table 221b is used in place of the count table 221a, the records of the count table 221b including parity bits are sorted in step S17, and the sorted count table 221b is written in step S19.

Figure 14:
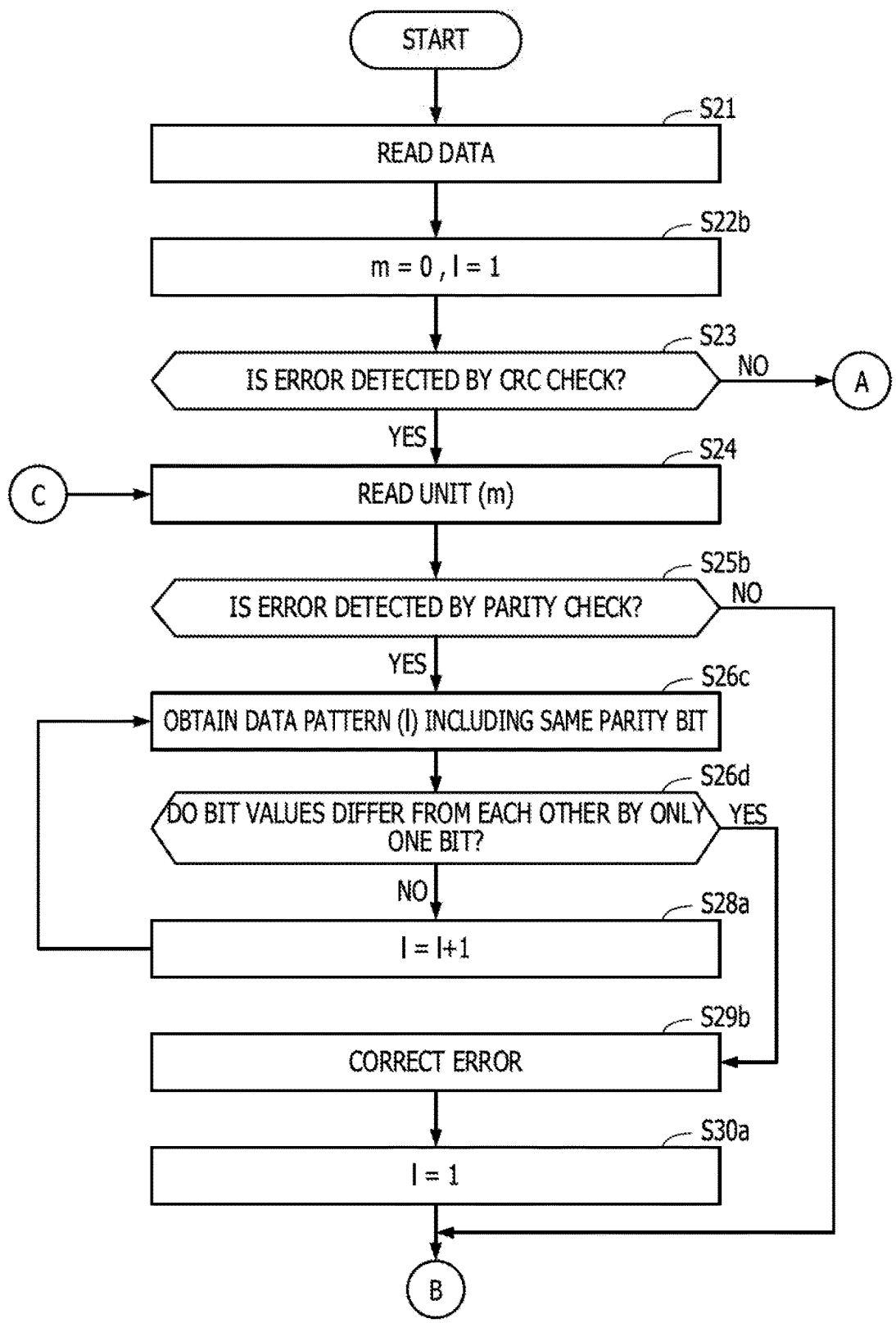
FIG. 14 is a flowchart illustrating an example of reading processing according to a fifth embodiment.

FIG. 14 is a flowchart illustrating an example of reading processing according to a fifth embodiment. In the fifth embodiment, the processing of FIG. 8 is modified as in FIG. 14. Description will be made only of processing steps different from FIG. 8, and description of other steps will be omitted. In addition, in the fifth embodiment, step S22 in FIG. 8 is changed to step S22b, step S25 in FIG. 8 is changed to step S25b, step S28 in FIG. 8 is changed to step S28a, step S29 in FIG. 8 is changed to step S29b, step S30 in FIG. 8 is changed to step S30a, and step S27 in FIG. 8 is not performed. Further, in the fifth embodiment, steps S26c and 26d are performed in place of step S26 in FIG. 8.

(S22b) The reading unit 223 assigns zero to m. In addition, the reading unit 223 assigns one to I. I is a variable indicating a ranking from the top of the count table 221b, which ranking is that of a record including the same parity bit as a parity bit added to a unit from which an error is detected among the records of the count table 221b, as will be described later. The reading unit 223 then advances the processing to step S23.

(S25b) The reading unit 223 determines whether or not an error is included in the unit (m) by using the parity bit added to the unit (m). When detecting an error, the reading unit 223 sets, as processing targets, only records including the same parity bit as the parity bit added to the unit (m) among the records of the count table 221b, and performs processing following step S26c. When detecting no error, the reading unit 223 advances the processing to step S31.

(S26c) The reading unit 223 refers to the count table 221b, and obtains a data pattern (I). The data pattern (I) is a data pattern registered in an I-th record (that is, a record including an I-th largest number of occurrences) from the top among the processing target records. The reading unit 223 then advances the processing to step S26d.

(S26d) The reading unit 223 compares the data pattern (I) obtained in step S26c with the unit (m). The reading unit 223 determines whether or not a result of the comparison indicates that the bit values differ from each other by one bit. When the bit values differ from each other by one bit, the reading unit 223 advances the processing to step S29b. When the bit values differ from each other by two bits or more, the reading unit 223 advances the processing to step S28a.

(S28a) The reading unit 223 adds one to I. The reading unit 223 then advances the processing to step S26c.

(S29b) The reading unit 223 corrects the error by replacing the unit (m) with the data pattern obtained in step S26c. The reading unit 223 then advances the processing to step S30a.

(S30a) The reading unit 223 assigns one to I. The reading unit 223 then advances the processing to step S31.

In the fifth embodiment, in a case where a unit of the written data includes an error, records including the same parity bit as a parity bit added to the unit in question are identified from the count table 221b. Thereby, candidates for a data pattern to be used for error correction may be narrowed down. Then, after the data pattern candidates are narrowed down, a data pattern whose bit value differs from the unit in question by one bit is identified among the data patterns of the identified records, and the error is corrected. It is thereby possible to enhance accuracy of correction of one-bit errors while shortening the time of the correction processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device configured to control a storage device, the control device comprising:
   a memory; and
   a processor coupled to the memory and configured to:
      store, into the storage device, a plurality of data blocks including a plurality of data patterns,
      for each of the plurality of data patterns, determine an occurrence number indicating how many data blocks of the plurality of data blocks have a data pattern from the plurality of data patterns,
      specify a first data pattern of the plurality of data patterns which has a largest number of the occurrence number among the plurality of data patterns,
      read a first data block among the plurality of data blocks from the storage device,
      determine whether first data in the first data block includes an error,
      when it is determined that the data pattern in the first data block includes the error, replace the first data included in the first data block with the first data pattern, and
      output the first data block including the first data pattern.

2. The control device according to claim 1, wherein
   each of the plurality of data blocks includes an error detecting code, and
   the processor is configured to detect the error in the first data of the first data block by using the error detecting code included in the first data block.

3. The control device according to claim 2, wherein the error detecting code is a parity bit.

4. The control device according to claim 3, wherein the processor is configured to:
   identify the parity bit of each of the plurality of data patterns, and
   select the first data pattern of which the number is higher than the numbers of the plurality of data patterns other than the first data pattern, when the error in the first data of the first data block is detected.

5. The control device according to claim 4, wherein the parity bit of the first data pattern is same as the parity bit of the first data block.

6. The control device according to claim 2, wherein the number of the data blocks having the first data pattern is higher than the numbers of the data blocks having the plurality of data patterns other than the first data pattern, the first data pattern includes a bit value different from the first data of the first data block by only one bit and includes same error detecting code as the error detecting code of the first data block.

7. A method of controlling a storage device executed by a control device, the method comprising:
   storing, in the storage device, a plurality of data blocks including a plurality of data patterns;
   for each of the plurality of data patterns, determining an occurrence number indicating how many data blocks of the plurality of data blocks have a data pattern from the plurality of data patterns;
   specifying a first data pattern of the plurality of data patterns which has a largest number of the occurrence number among the plurality of data patterns;
   reading a first data block among the plurality of data blocks from the storage device;
   determining whether first data in the first data block includes an error;
   when it is determined that the data pattern in the first data block includes the error, replacing the first data included in the first data block with the first data pattern; and
   outputting the first data block including the first data pattern.

8. The method according to claim 7, wherein
   each of the plurality of data blocks includes an error detecting code, and the method further comprises:
   detecting the error in the first data of the first data block by using the error detecting code included in the first data block.

9. The method according to claim 8, wherein the error detecting code is a parity bit.

10. The method according to claim 9, the method further comprising:
    identifying the parity bit of each of the plurality of data patterns; and selecting the first data pattern of which the number is higher than the numbers of the plurality of data patterns other than the first data pattern, when the error in the first data of the first data block is detected.

11. The method according to claim 10, wherein the parity bit of the first data pattern is same as the parity bit of the first data block.

12. The method according to claim 8, wherein the number of the data blocks having the first data pattern is higher than the numbers of the data blocks having the plurality of data patterns other than the first data pattern, the first data pattern includes a bit value different from the first data of the first data block by only one bit and includes same error detecting code as the error detecting code of the first data block.

13. A storage system comprising:
a storage device; and
a processor coupled to the storage device, the processor is configured to:
store, into the storage device, a plurality of data blocks including a plurality of data patterns,
for each of the plurality of data patterns, determine an occurrence number indicating how many data blocks of the plurality of data blocks have a data pattern from the plurality of data patterns,
specify a first data pattern of the plurality of data patterns which has a largest number of the occurrence number among the plurality of data patterns,
read a first data block among the plurality of data blocks from the storage device,
determine whether first data in the first data block includes an error,
when it is determined that the data pattern in the first data block includes the error, replace the first data included in the first data block with the first data pattern, and
output the first data block including first data pattern.

14. The storage system according to claim 13, wherein each of the plurality of data blocks includes an error detecting code, and
the processor is configured to detect the error in the first data of the first data block by using the error detecting code included in the first data block.

15. The storage system according to claim 14, wherein the error detecting code is a parity bit.

16. The storage system according to claim 15, wherein the processor is configured to:
identify the parity bit of each of the plurality of data patterns, and
select the first data pattern of which the number is higher than the numbers of the plurality of data patterns other than the first data pattern, when the error in the first data of the first data block is detected.

17. The storage system according to claim 16, wherein the parity bit of the first data pattern is same as the parity bit of the first data block.

18. The storage system according to claim 14, wherein the number of the data blocks having the first data pattern is higher than the numbers of the data blocks having the plurality of data patterns other than the first data pattern, the first data pattern includes a bit value different from the first data of the first data block by only one bit and includes same error detecting code as the error detecting code of the first data block.

* * * * *